(12) United States Patent
Bogatscher et al.

(10) Patent No.: US 11,500,069 B2
(45) Date of Patent: Nov. 15, 2022

(54) OPTICAL SYSTEM FOR DETECTING A SCANNING FIELD

(71) Applicant: Robert Bosch GmbH, Stuttgart (DE)

(72) Inventors: Siegwart Bogatscher, Leonberg (DE); Klaus Stoppel, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 969 days.

(21) Appl. No.: 16/319,142

(22) PCT Filed: Jul. 12, 2017

(86) PCT No.: PCT/EP2017/067476
§ 371 (c)(1),
(2) Date: Jan. 18, 2019

(87) PCT Pub. No.: WO2018/015229
PCT Pub. Date: Jan. 25, 2018

(65) Prior Publication Data
US 2021/0333365 A1     Oct. 28, 2021

(30) Foreign Application Priority Data

Jul. 22, 2016   (DE) .......................... 102016213446.9

(51) Int. Cl.
*G01S 7/481*     (2006.01)
*G02B 26/08*     (2006.01)
(Continued)

(52) U.S. Cl.
CPC ............ *G01S 7/4817* (2013.01); *G01S 7/484* (2013.01); *G01S 7/4816* (2013.01); *G02B 26/0833* (2013.01); *G02B 27/0087* (2013.01)

(58) Field of Classification Search
CPC .... G01S 7/4814; G01S 7/4816; G01S 7/4817; G01S 7/484; G01S 7/486; G01S 7/497;
(Continued)

(56) References Cited

U.S. PATENT DOCUMENTS

| 5,241,315 A | 8/1993 | Spinhime |
| 6,636,310 B1 | 10/2003 | Ben-Dov et al. |
(Continued)

FOREIGN PATENT DOCUMENTS

| DE | 19936847 A1 | 2/2000 |
| DE | 102006040813 A1 | 1/2008 |
(Continued)

OTHER PUBLICATIONS

International Search Report for PCT/EP2017/067476, dated Dec. 15, 2017.
(Continued)

*Primary Examiner* — Yuqing Xiao
*Assistant Examiner* — Benjamin Richard Hebert
(74) *Attorney, Agent, or Firm* — Norton Rose Fulbright US LLP; Gerard Messina

(57) ABSTRACT

An optical system for detecting a scanning field, a system for controlling the optical system as well as a method for controlling the optical system, the optical system having at least one transmitter comprising at least one source for emitting electromagnetic radiation and at least one deflection unit for deflecting the beam path of the electromagnetic radiation emitted by the source into the scanning field. The optical system furthermore has at least one optical receiver comprising at least one optical filter element for filtering the electromagnetic radiation scattered back and/or reflected in the scanning field and at least one detector element for detecting the filtered electromagnetic radiation. The essence of the invention lies in the fact that it is possible to vary the wavelength of the electromagnetic radiation emitted by the source and that the variation of the wavelength occurs as a function of the deflection of the beam path.

9 Claims, 9 Drawing Sheets

(51) Int. Cl.
*G02B 27/00* (2006.01)
*G01S 7/484* (2006.01)

(58) Field of Classification Search
CPC .. G01S 17/42; G02B 26/0833; G02B 27/0087
See application file for complete search history.

(56) References Cited

U.S. PATENT DOCUMENTS

| | | | |
|---|---|---|---|
| 2013/0242400 A1* | 9/2013 | Chen | G02B 27/0087 359/618 |
| 2016/0041266 A1 | 2/2016 | Smits | |
| 2017/0102461 A1* | 4/2017 | Tezuka | G01S 7/4863 |
| 2017/0255077 A1* | 9/2017 | Pruessner | G01S 7/4817 |
| 2017/0261612 A1* | 9/2017 | Akiyama | G01S 7/4865 |
| 2017/0350982 A1* | 12/2017 | Lipson | G01S 7/4802 |
| 2017/0357004 A1* | 12/2017 | Puente | F21S 41/176 |
| 2019/0265574 A1* | 8/2019 | Skirlo | G01S 7/4813 |

FOREIGN PATENT DOCUMENTS

| | | | | |
|---|---|---|---|---|
| EP | 0390969 A2 | * | 10/1990 | ........... G05B 19/231 |
| EP | 2905576 A1 | | 8/2015 | |
| GB | 2300325 A | * | 10/1996 | ............. G01S 7/481 |
| JP | H08201521 A | | 8/1996 | |
| JP | 2007085832 A | | 4/2007 | |
| JP | 2007279017 A | | 10/2007 | |
| JP | 2013019790 A | | 1/2013 | |
| JP | 2014074633 A | | 4/2014 | |
| JP | 2015180855 A | * | 10/2015 | ............. G01S 17/48 |

OTHER PUBLICATIONS

Van Acoleyen, et al.: "One Dimensional Off Chip Beam Steering and Shaping Using Optical Phased Arrays on Silicon on Insulator," Journal of Lightwave Technology (online), 29(23), (2011), pp. 3500-3505.

* cited by examiner

OPTICAL SYSTEM FOR DETECTING A SCANNING FIELD

FIELD OF THE INVENTION

The present invention relates to an optical system for detecting a scanning field, a system for controlling an optical system for detecting a scanning field, as well as a method for controlling an optical system for detecting a scanning field.

BACKGROUND INFORMATION

In optical systems for detecting a scanning field, for example scanning biaxial LIDAR sensors and biaxial 3D scanners, optical band-pass filters (interference filters) are used for blocking incident ambient light (for example sunlight). Patent document U.S. Pat. No. 5,241,315 discusses an eye-safe, compact, solid state lidar for profiling atmospheric cloud and aerosol scattering. In this system, the photon noise of the receiver caused by daylight is controlled by a narrow receiver field-of-view and a narrow bandwidth temperature-controlled band-pass filter.

Interference filters are usually used as band-pass filters having a narrow bandwidth. These filters, however, themselves contribute sensitively to reducing the field-of-view of the receiver. This reduction is due to the fact that the transmittance characteristic of band-pass filters shifts toward lower wavelengths with a rising angle of incidence of the light toward the perpendicular line of the filter surface.

Optical systems for detecting a scanning field, such as LIDAR sensors for example, may be used in driver assistance systems for motor vehicles for detecting the traffic surroundings, for example in order to locate preceding vehicles or other obstacles. For this purpose, the field-of-view of the receiver should extend over the entire angular range of the scanning optical system. In order to ensure this, generally the envelope curve of all transmittance characteristics that arise from the different angles of incidence is chosen as the half width of the filter. For this reason, the band-pass filters used for these applications usually have a half width of approx. 30-40 nm. This in turn entails the disadvantage that undesired ambient light from the entire scanning field, which lies in the transmittance range of the filter, is able to strike the detector of the receiver. The dynamic range of the detector as well as the signal-to-noise ratio are thereby reduced. Moreover, the ambient light is converted into current in the detector, which especially in large detectors or detector arrays results in great power losses and thus in heat generation.

SUMMARY OF THE INVENTION

The present invention is based on an optical system for detecting a scanning field having at least one transmitter comprising at least one source for emitting electromagnetic radiation, at least one deflection unit for deflecting the beam path of the electromagnetic radiation emitted by the source into the scanning field, and at least one optical receiver comprising at least one optical filter element for filtering the electromagnetic radiation backscattered and/or reflected in the scanning field and at least one detector element for detecting the filtered electromagnetic radiation.

According to the present invention, it is possible to vary the wavelength of the electromagnetic radiation emitted by the source, and the variation of the wavelength occurs as a function of the deflection of the beam path.

The advantage of the present invention lies in the fact that the half width of the optical band-pass filter may be markedly reduced without thereby reducing the scan-angle range/the scanning field. Furthermore, the adjustability of the wavelength makes it possible to compensate for manufacturing-related fluctuations of the central wavelength of the source, which for example may amount up to 10 nm in commonly used laser diodes. Furthermore, the probability of a mutual blinding of several sensors is markedly reduced since it is possible sequentially to modify not only the current direction of view but at the same time also the wavelength.

In order to detect a scanning field and to detect objects in this scanning field, the source emits electromagnetic radiation in a known manner. One advantageous development of the present invention provides for the source for emitting electromagnetic radiation to be a laser, which may be a diode laser. The advantage of this development lies in the fact that the use of monochromatic or polarized electromagnetic radiation is able to increase the reliability of the object detection.

The electromagnetic radiation is scattered back and/or reflected by objects located in the scanning field and is subsequently detected by the detector element. In another development of the present invention, the at least one optical filter element of the optical receiver is a band-pass filter. The advantage of this development lies in the fact that only electromagnetic radiation in the range of the bandwidth of the band-pass filter reaches the detector. Radiation of wavelengths outside of the range of the bandwidth of the band-pass filter (for example interfering ambient radiation) is blocked and does not reach the detector.

The detection of a scanning field in the sense of the present invention is to be understood as the ability to detect objects in the scanning field, to determine distances between the optical system and an object located in the scanning field and/or to detect characteristic features of an object located in the scanning field (e.g. reflectivity).

The bandwidth of the band-pass filter in the sense of the present invention is to be understood as the range around the central wavelength of the filter that is transparent for electromagnetic radiation. In optics, the term half width is also frequently used. This is the difference of the two wavelengths, at which the transmittance of an optical filter, specifically a band-pass filter, has fallen to half the value of the maximum transmittance.

In another development of the present invention, the deflection of the electromagnetic radiation occurs in an angular range around a predetermined orientation of the scanning field. The advantage of this development lies in the fact that it is possible to define precisely at which deflection angle electromagnetic radiation of a specific wavelength is emitted into the scanning field.

In another specific development of the present invention, the variation of the wavelength is a function of the transmittance of the at least one optical filter element. The advantage of this development lies in the fact that it makes it possible for the wavelength of the electromagnetic radiation of the source to be in the transmittance range of the band-pass filter.

In another development of the present invention, the deflection unit is a deflection mirror, which may be a micromirror, that is able to swivel in an oscillating manner around the orientation of the scanning field and/or in a second dimension. The advantage of this development lies in the fact that it also makes possible a precisely adjustable beam deflection and even a beam deflection about two axes.

The variation of the wavelength of the source may be kept relatively low in order to achieve a sufficiently large scanning field.

In one advantageous development of the invention, the wavelength of the electromagnetic radiation emitted by the source is varied synchronously with the deflection mirror that is able to swivel in an oscillating manner. The advantage of this development lies in the fact that radiation at a wavelength corresponding to the central wavelength of the band-pass filter is able to be emitted along the orientation of the scanning field. In the respectively greatest deflection (in the positive or negative direction from the orientation of the scanning field) radiation may be emitted at the lowest wavelength. This also makes it possible for the wavelength of the electromagnetic radiation of the source to be at all times within the transmittance range of the band-pass filter.

In another development of the present invention, the deflection unit is an optical phased array. The advantage of this development lies in the fact that in a beam deflection it is possible to dispense with the use of electromechanical components such as for example a macromirror or a micromirror. Electromechanical components are especially prone to wear. Defects or losses of adjustment may occur over time. Dispensing with corresponding electromechanical components may thus result in a longer service life of the optical system. Furthermore, it is possible for mechanical interferences to occur when using electromechanical components. Thus it is possible e.g. for shocks or vibrations to result in faulty measurements. By using optical phased arrays it is possible to avoid such interfering influences. Furthermore, it is possible to achieve a more compact construction of the optical system.

An optical phased array, also called phased array, is made up of antennas, usually arranged on a chip, which are able to deflect electromagnetic radiation that is coupled in. Thus, Feng et al., inter alia, disclosed a combination of an optical phased array and a laser variable in terms of wavelength, in which it was possible by varying the wavelength of the laser to change the direction of beam of the optical phased array ("Optical Phased-Array Beam Steering Controlled by Wavelength", Applied Optics, Vol. 44, Issue 26, 5429-5433 (2005)).

In one advantageous development of the present invention, the electromagnetic radiation emitted by the source is coupled into the optical phased array with the aid of branchings and waveguides. The advantage of this development lies in the fact that the electromagnetic radiation emitted by the source is able to be coupled into the optical phased array and subsequently deflected, in a nearly lossless manner.

In another advantageous development of the present invention, the optical filter element is positioned in the optical receiver in such a way that it is deflected by an angle from the optical axis of the receiver unit.

In one development of the present invention, the angle depends on the transmittance of the optical filter element. The advantage of this development lies in the fact that received electromagnetic radiation of any emitted wavelength is able to be in the transmittance maximum of the filter. The angle may be chosen to be such that the received beam having the greatest wavelength strikes precisely perpendicular to the filter surface. In this manner, it is possible for the received beam having the greatest wavelengths to be in the transmittance maximum of the filter. Received electromagnetic radiation of a smaller wavelength does not strike the filter surface perpendicularly, but rather at an angle, and is therefore likewise able to be in the transmittance maximum of the filter.

In another development, the receiver of the optical system for detecting a scanning field has a lens for focusing the received electromagnetic, filtered by the optical filter element, onto the detector element.

The present invention also claims a system for controlling an optical system for detecting a scanning field. The optical system in this case has at least one transmitter comprising at least one source for emitting electromagnetic radiation and at least one deflection unit for deflecting the beam path of the electromagnetic radiation emitted by the source into the scanning field. The optical system furthermore has at least one optical receiver comprising at least one optical filter element for filtering the electromagnetic radiation scattered back and/or reflected in the scanning field and at least one detector element for detecting the filtered electromagnetic radiation. It is possible to vary the wavelength of the electromagnetic radiation emitted by the source and the variation of the wavelength occurs as a function of the deflection of the beam path.

The present invention also claims a method for controlling an optical system for detecting a scanning field. The optical system in this case has at least one transmitter comprising at least one source for emitting electromagnetic radiation and at least one deflection unit for deflecting the beam path of the electromagnetic radiation emitted by the source into the scanning field. The optical system furthermore has at least one optical receiver comprising at least one optical filter element for filtering the electromagnetic radiation scattered back and/or reflected in the scanning field and at least one detector element for detecting the filtered electromagnetic radiation. It is possible to vary the wavelength of the electromagnetic radiation emitted by the source, and the variation of the wavelength occurs as a function of the deflection of the beam path.

In the following, exemplary embodiments of the present invention are explained in greater detail with reference to the accompanying drawings.

DETAILED DESCRIPTION

Figure 1:
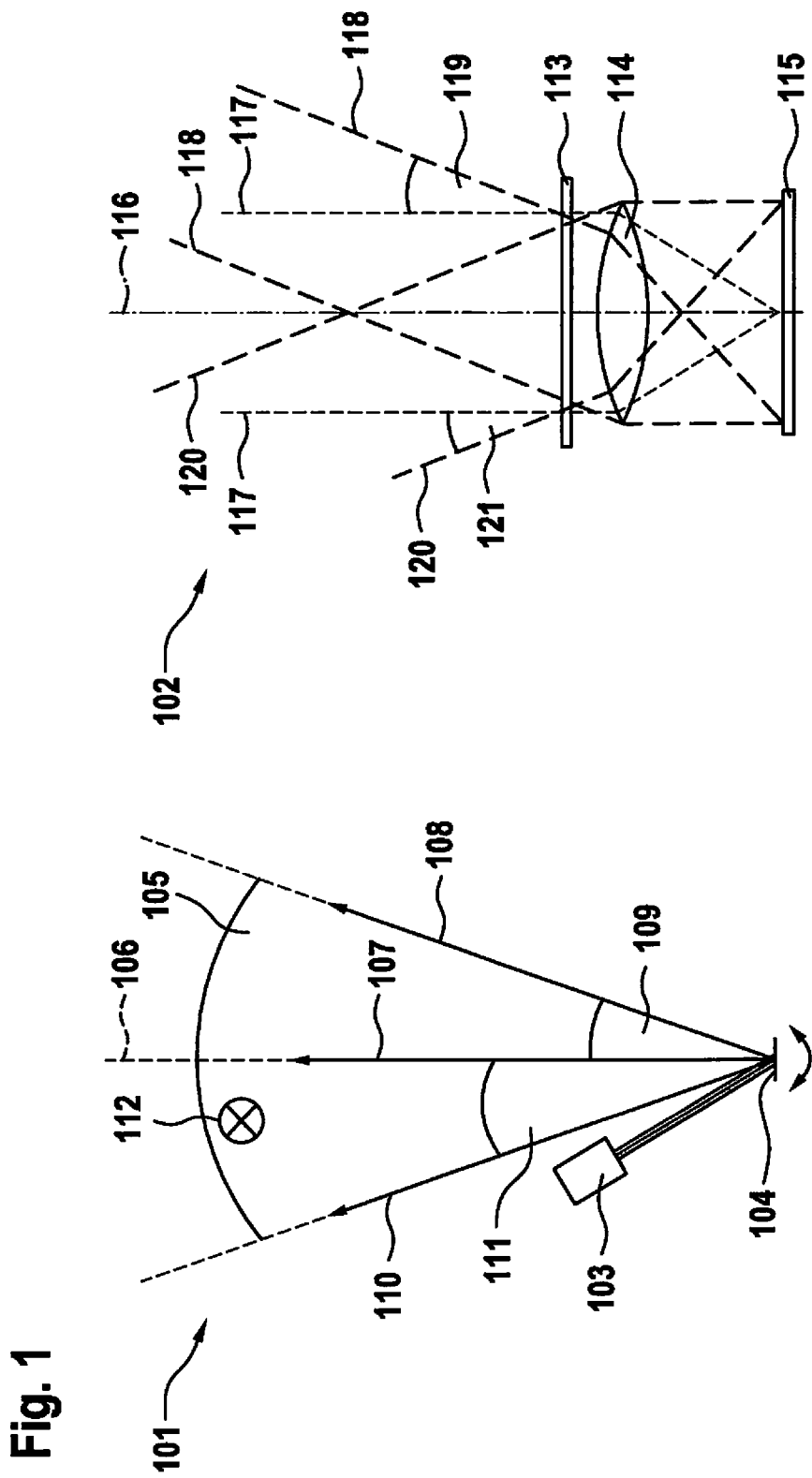
FIG. 1 shows a construction and beam path of a biaxial optical system for detecting a scanning field according to the related art.

FIG. 1 shows by way of example the construction and beam path of a biaxial optical system for detecting a scanning field according to the related art. The optical system may be a biaxial 3D scanner for example. The left portion of FIG. 1 shows transmitter/transmitter unit 101, while the right portion shows optical receiver/receiver unit 102. Transmitter unit 101 contains a source 103, which is a laser. Laser 103 emits electromagnetic radiation in a frequently very narrow frequency range, that is, monochromatic radiation. The radiation strikes a deflection unit 104, in FIG. 1 a micromirror, by which the radiation is deflected into a scanning field 105 defined by an angular range at a predetermined orientation 106. By moving the micromirror, a laser beam 107 is thus emitted for example along the orientation of scanning field 106, a laser beam 108 is deflected by a negative angle 109 from the orientation 106 of scanning field 105, and a laser beam 110 is deflected by a positive angle 111 from orientation 106 of scanning field 105. Angles 109 and 111 are here the angles that are maximally possible or necessary in order completely to detect the scanning field 105 defined by an angular range. Transmitter unit 101 transmits electromagnetic radiation and receiver unit 102 receives electromagnetic radiation that was scattered back and/or reflected in scanning field 105 on an object 112.

Receiver unit 102 is oriented along its optical axis 116. The orientation of this optical axis 116 corresponds in the example to the orientation of scanning field 106. The electromagnetic radiation received by receiver unit 102 is filtered with the aid of optical filter element 113, in the example a band-pass filter, and is focused onto detector element 115 by a lens 114. Receiver unit 102 is oriented along optical axis 116. The beam path of electromagnetic beams received by receiver unit 102 is represented by dashed lines 117, 118 and 120. In the example, beam 117 is scattered back and/or reflected along optical axis 116 of receiver unit 102. Beam 118 is a beam that is scattered back and/or reflected at a negative angle 119 from optical axis 116 of receiver unit 102, while beam 120 is a beam that is scattered back and/or reflected at a positive angle 121 from optical axis 116 of receiver unit 102. The wavelength of the electromagnetic radiation changes barely to not at all as a result of the backscattering or reflection on object 112 in scanning field 105. The wavelengths of beams 117, 118 and 120 are thus nearly identical and nearly correspond to the wavelength of the electromagnetic radiation that was emitted by monochromatic laser 103.

Figure 2:
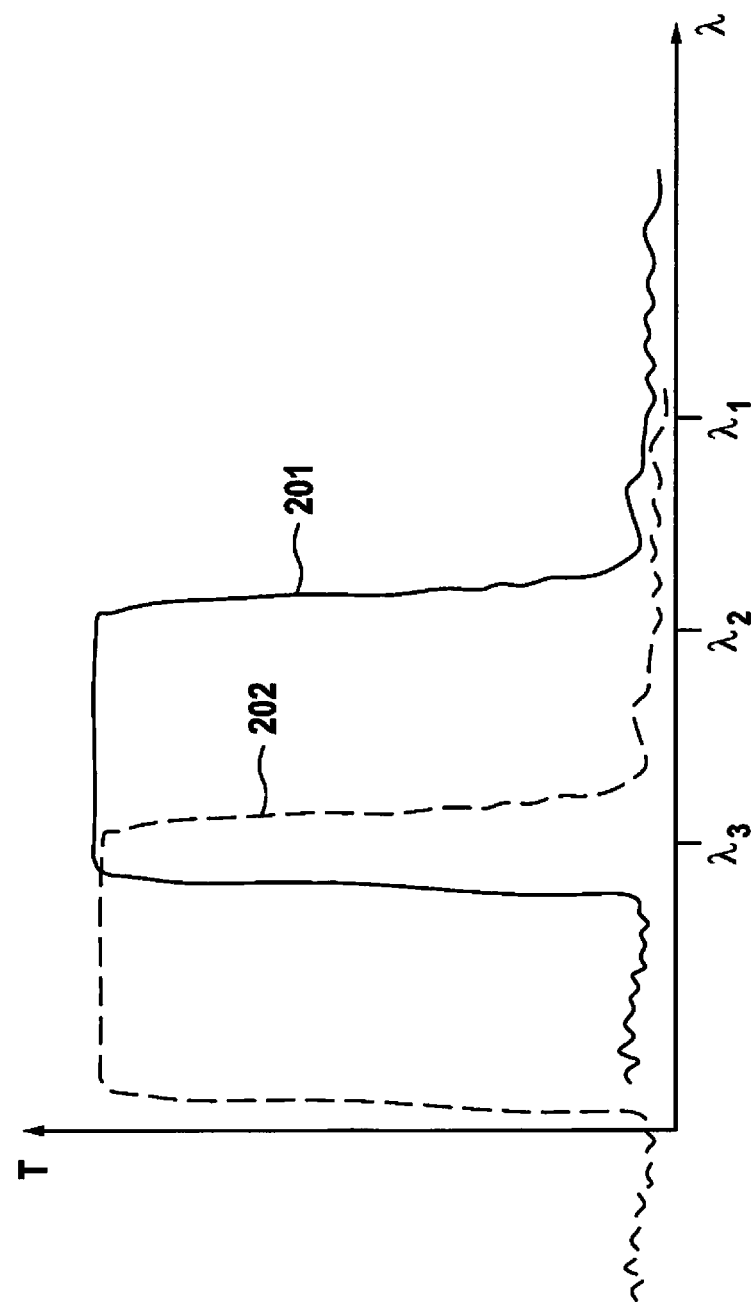
FIG. 2 shows a filter characteristic of a band-pass filter in an optical system for detecting a scanning field according to the related art.

As already described above, according to the related art, a band-pass filter 113 is selected whose half width usually lies in a range of approx. 30-40 nm. FIG. 2 shows once again why this is necessary. In the diagram shown, the transmittance T of optical filter element 113 is plotted against wavelength A of the emitted or backscattered and/or reflected radiation. The transmittance T indicates the ratio of the radiation intensity that filter 113 allows to pass to the incident radiation intensity. Solid line 201 shows the filter characteristic/the transmittance curve of optical filter element 113 for a beam 117 that arrives along optical axis 116 of receiver unit 102. Dashed line 202 shows the filter characteristic/the transmittance curve of optical filter element 113 for beams 118 and 120 that arrive at angles 119 and 121, respectively, in relation to optical axis 116 of receiver unit 102. In order to cover the entire angular range of scanning field 105 and for receiver unit 102 to be able to detect all radiation backscattered and/or reflected there, the half width of the band-pass filter must be selected usually in the range of approx. 30-40 nm. $\lambda_3$ is selected as emission wavelength of laser 103, which corresponds as much as possible to the central wavelength of band-pass filter 113. If $\lambda_2$ were selected as the emission wavelength of laser 103, then it would be possible to detect radiation 107 and, respectively, 117, which is emitted and backscattered and/or reflected along the orientation of scanning field 106. Radiation 108 and 110 and, respectively, 118 and 120, which is emitted and backscattered and/or reflected at angles 109 and 111 and, respectively, 119 and 121, could not be detected by receiver unit 102 for example. Wavelength $\lambda_1$ would be completely unsuitable as an emission wavelength of laser 103.

Figure 3:
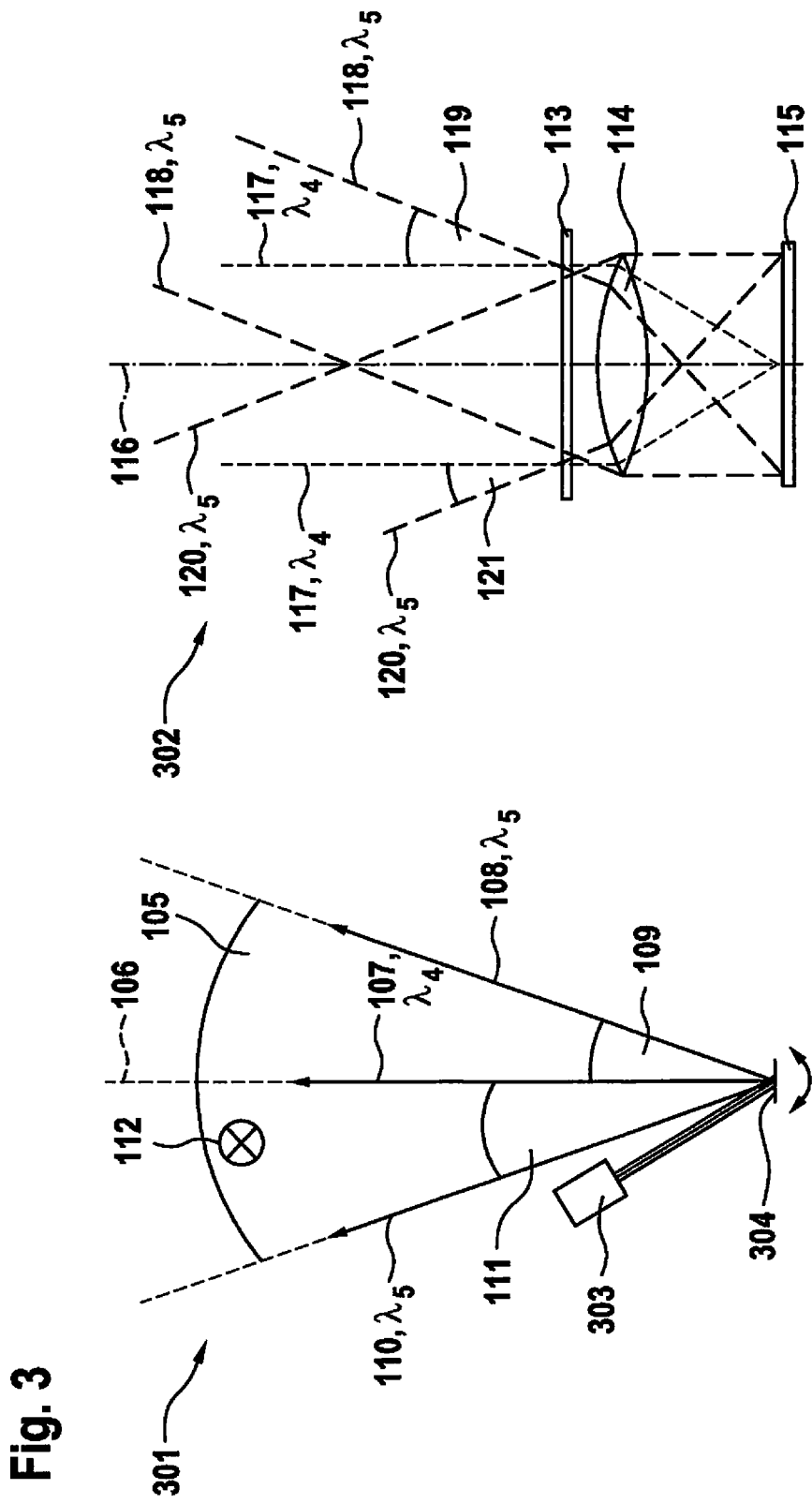
FIG. 3 shows a construction and beam path of an optical system for detecting a scanning field according to one variant of an embodiment of the present invention including a micromirror.

FIG. 3 shows the construction and beam path of an optical system for detecting a scanning field 105 according to one variant of an embodiment of the present invention including micromirror 304. The left portion of the figure shows transmitter unit 301, while the right portion of the figure shows receiver unit 302 of the variant of the embodiment. The construction and beam path resemble the optical system as shown in FIG. 1. The decisive difference, however, lies in the fact that the optical system has as source a laser 303 that is variable in terms of wavelength. The electromagnetic radiation emitted by this laser 303 may have wavelengths in various ranges of the electromagnetic spectrum. The radiation may be for example in the range of visible light or also in other ranges such as in the infrared or ultraviolet ranges. Due to the variability of the wavelength of laser 303 it is possible for laser beam 107, which is emitted along the orientation of scanning field 106, to be emitted for example at a wavelength $\lambda_4$, while laser beams 108 and 110, by contrast, may be emitted at a wavelength $\lambda_5$ that differs from $\lambda_4$. The electromagnetic radiation emitted by variable-wavelength laser 303 is emitted by a micromirror 304 into scanning field 105. The electromagnetic radiation scattered and/or reflected in scanning field 105 on an object 112 is detected by receiver unit 302. In the example, optical axis 116 of receiver unit 302 again has the same orientation as scanning field 105. Accordingly, detected beam 117 will have wavelength $\lambda_4$, and detected beams 118 and 120 will have wavelength $\lambda_5$. The resulting advantage is shown in more detail in FIG. 4.

Figure 4:
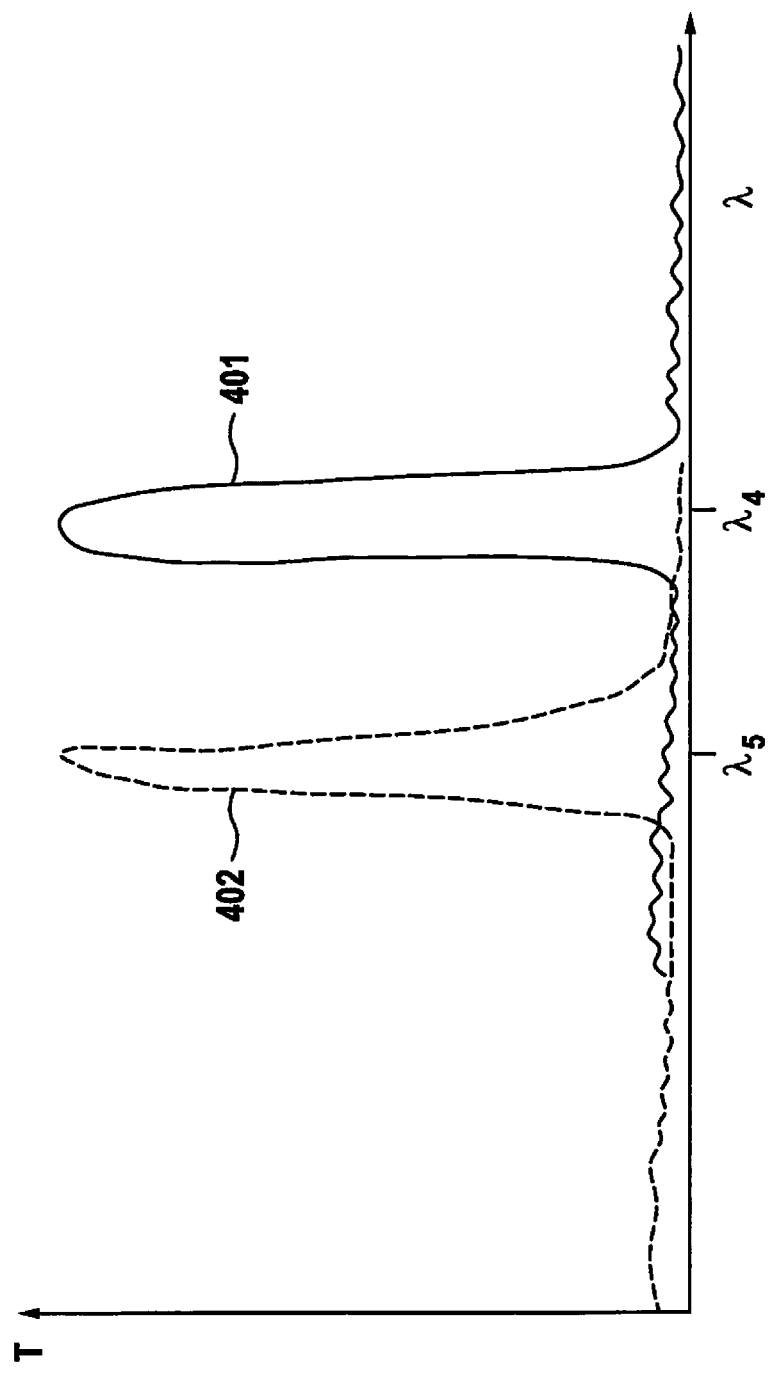
FIG. 4 shows a transmittance characteristic of a band-pass filter according to one variant of an embodiment of the present invention including a micromirror.

FIG. 4 shows the transmittance characteristic of a band-pass filter 113 according to the variant of the embodiment of the present invention having micromirror 304. In the diagram shown, the transmittance T of optical filter element 113 is again plotted against wavelength $\lambda$ of the emitted or backscattered and/or reflected radiation. Curve 401 shows the filter characteristic of band-pass filter 113 for a backscattered and/or reflected beam 117 that arrives along optical axis 116 of receiver unit 302. As is common for band-pass filters, this transmittance characteristic shifts toward shorter wavelengths when the incident beams 118 and 120 are deflected by a negative angle 119 or a positive angle 121 from optical axis 116 of receiver unit 302. The filter characteristic of band-pass filter 113 is in this case shown by curve 402. Using a wavelength-variable laser 303 makes it possible for the wavelength of the emitted and received electromagnetic radiation to be within the transmittance range of the band-pass filter. Ideally it is selected in such a way that it lies as precisely as possible in the transmittance maximum. In FIG. 4, band-pass filter 113 for example shows a transmittance maximum for beams 117, which are received along optical axis 116 of receiver unit 302, at wavelength $\lambda_4$; for received beams 118 and 120, which are deflected by a negative angle 119 and, respectively, a positive angle 121 from optical axis 116 of receiver unit 302, at wavelength $\lambda_5$. The wavelength of laser 303 for beams 107 emitted along the orientation of scanning field 106 is thus selected if possible at $\lambda_4$. For beams 108 and 110, which are deflected by a negative angle 109 and, respectively, a positive angle 110 from the orientation 106 of scanning field 105, the wavelength of laser 303 is selected if possible to be $\lambda_5$. Thus it is possible to ensure that the backscattered and/or reflected electromagnetic radiation is as precisely as possible in the transmittance maximum of filter characteristic 401 or, respectively, 402 of band-pass filter 113. The half width of band-pass filter 113 may be selected to be narrow.

Figure 5:
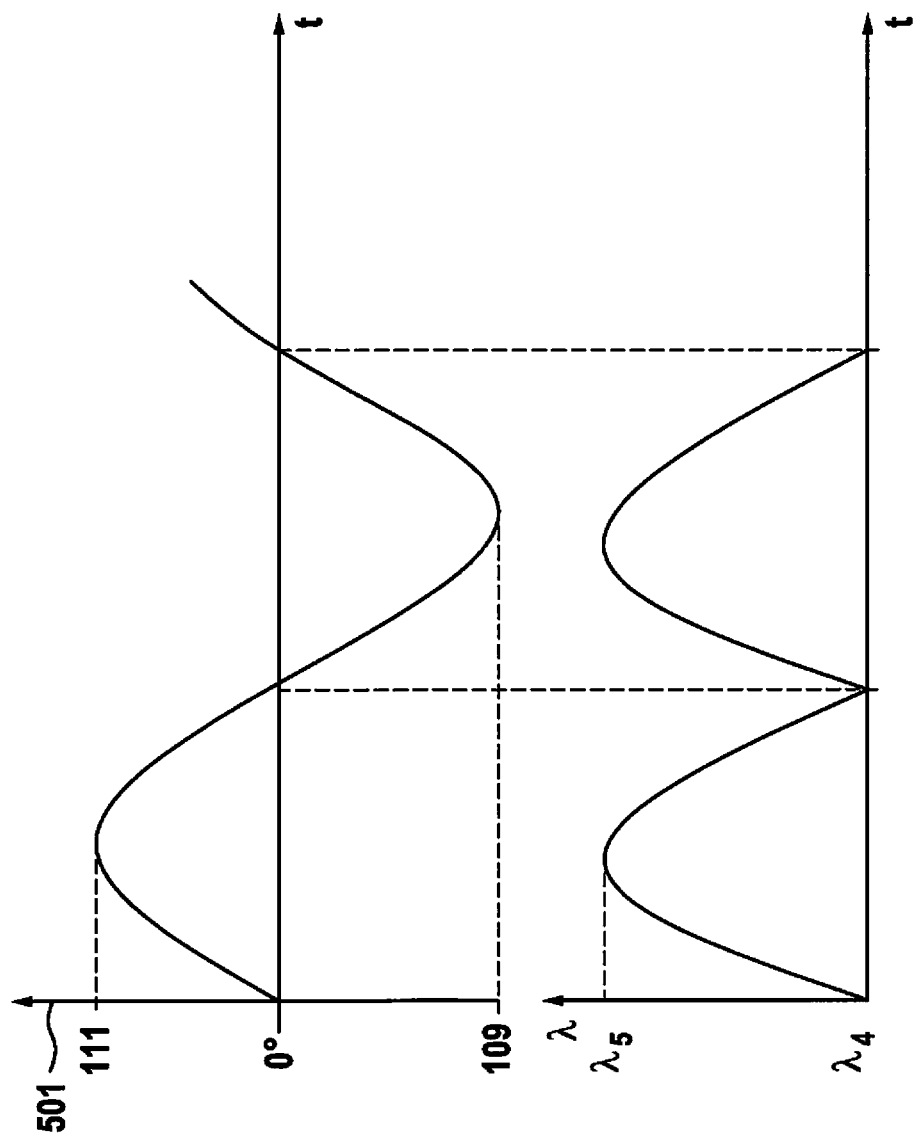
FIG. 5 shows an exemplary control signal for the wavelength of a wavelength-variable laser according to one variant of an embodiment of the present invention including a micromirror that is able to swivel in an oscillating manner.

FIG. 5 shows in an exemplary embodiment the control signal for the wavelength of a wavelength-variable laser 303 in the case of a micromirror 304 that is able to swivel about an axis in an oscillating manner. In the upper portion of the diagram, angle 501 of the deflection of the electromagnetic radiation around orientation 106 of scanning field 105 is plotted against time t. By moving micromirror 304 it is possible to deflect the radiation respectively up to negative angle 109 and up to positive angle 111 in such a way that the angular range spanned by scanning field 105 is able to be illuminated entirely. The wavelength of laser 303 may be varied synchronously with the beam deflection. In the respective maximum deflection by negative angle 109 or positive angle 100, laser 303 emits radiation at a wavelength $\lambda_5$. In the event of a deflection by an angle of 0°, that is, when the laser beam is emitted along the orientation of scanning field 106, laser 303 emits radiation at a wavelength $\lambda_4$. In the angular ranges in between, the radiation of laser 303 may be varied synchronously with the deflection. This makes it possible to ensure that the wavelength of laser 303 is at all times in the transmittance range of the band-pass filter.

Figure 6:
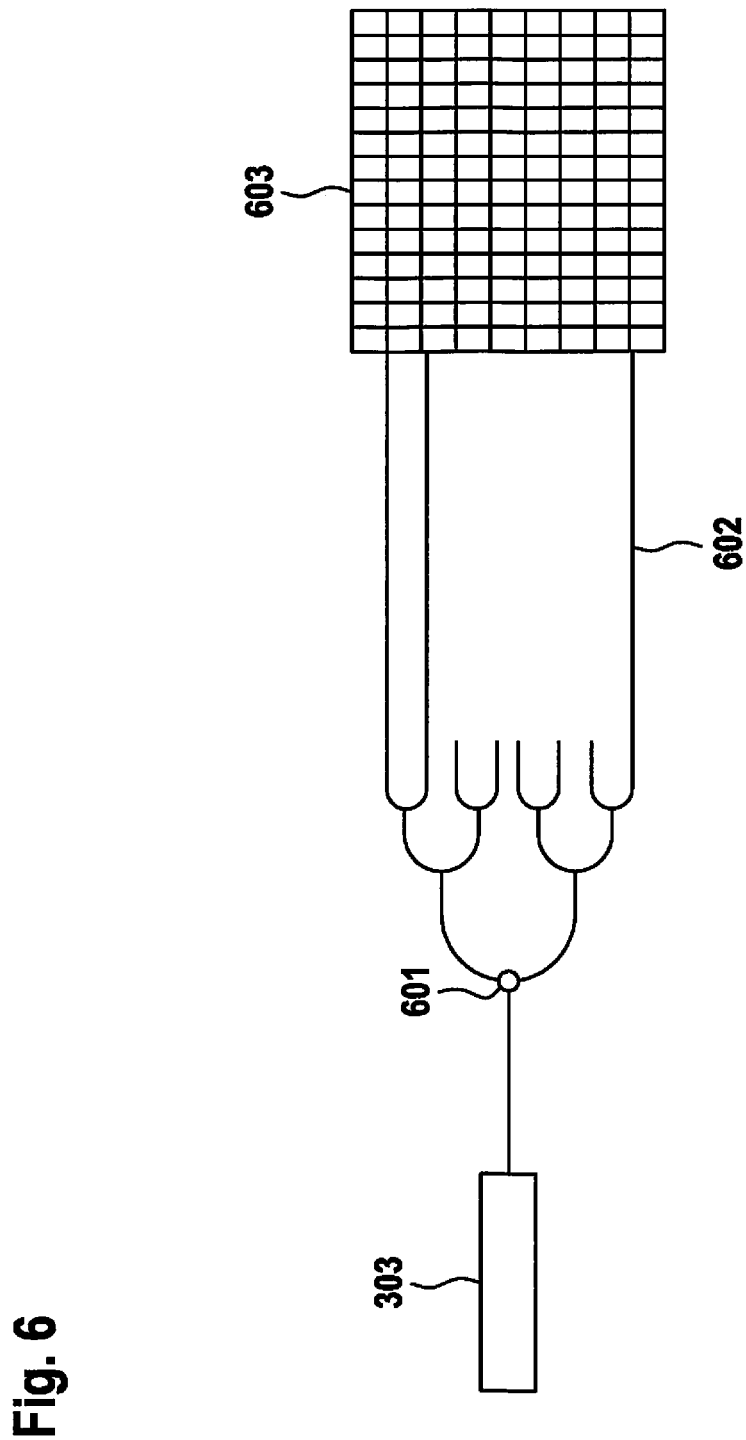
FIG. 6 shows a schematic representation of a wavelength-variable laser whose output beam is coupled into an optical phased array.

According to one variant of an embodiment of the present invention, deflection unit 104 is an optical phased array 603. FIG. 6 shows a schematic representation of a wavelength-variable laser 303 whose output beam is coupled into an optical phased array 603. The beam is split into many partial beams by several splitters 601 and via waveguide 602 is coupled into the optical phased array.

Figure 7:
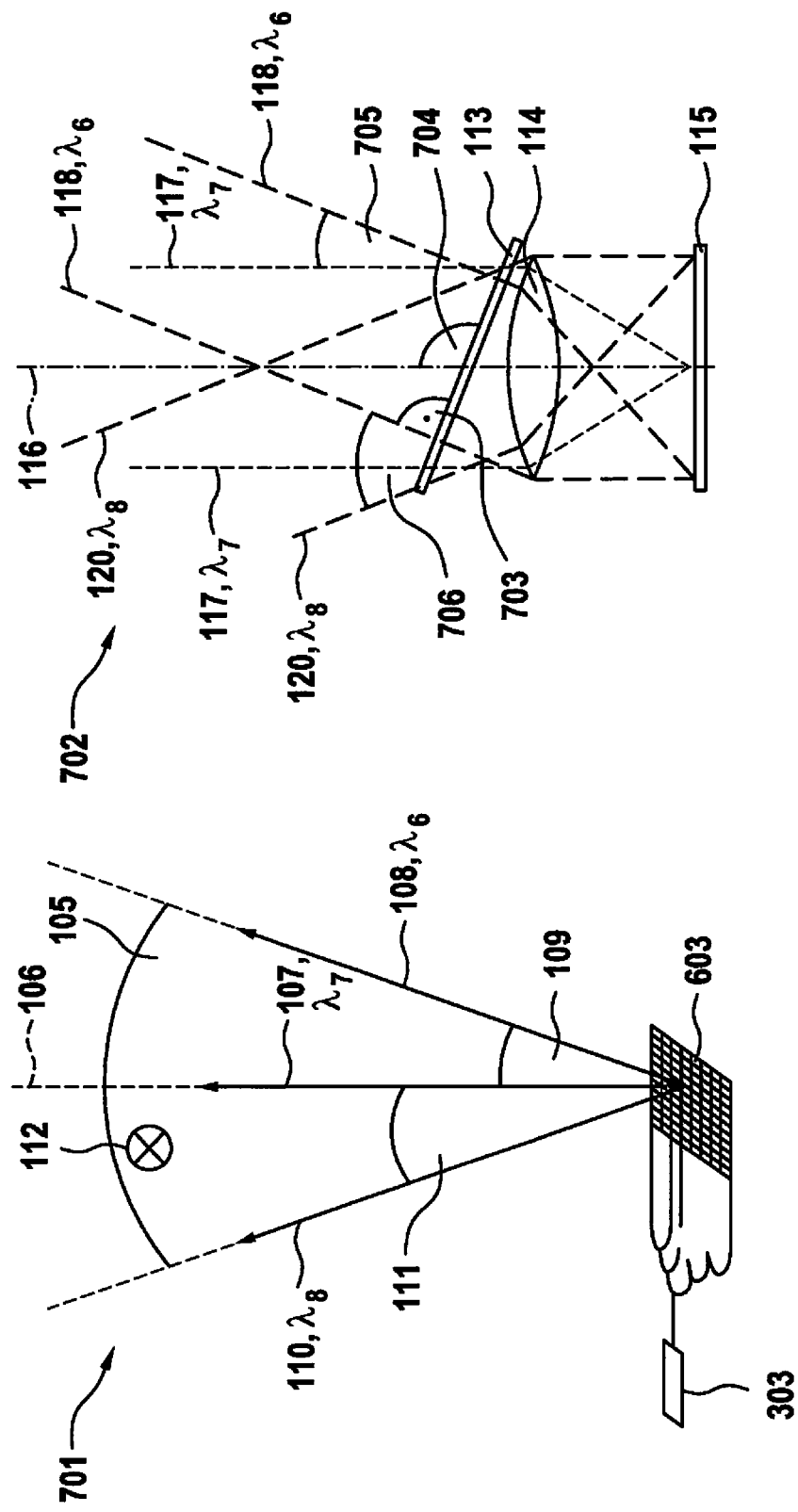
FIG. 7 shows a construction and beam path of an optical system for detecting a scanning field according to one variant of an embodiment of the present invention including an optical phased array.

FIG. 7 shows the construction and beam path of an optical system for detecting a scanning field 105 according to one variant of an embodiment of the present invention having optical phased array 603. The left portion of the figure shows transmitter unit 701, while the right portion of the figure shows receiver unit 702. In transmitter unit 701, a wavelength-variable laser 303 and an optical phased array 603, as they were shown in FIG. 6, are used for emitting electromagnetic radiation of various wavelengths into scanning field 105. In this example, in contrast to micromirror 304 shown in the previous exemplary embodiment, optical phased array 603 is not situated in a movable manner, but rather is perpendicular to the orientation of scanning field 106. The deflection of the emitted laser beams may be performed here on the basis of the properties of optical phased array 603. This may be explained in more detail with reference to FIG. 8.

Figure 8:
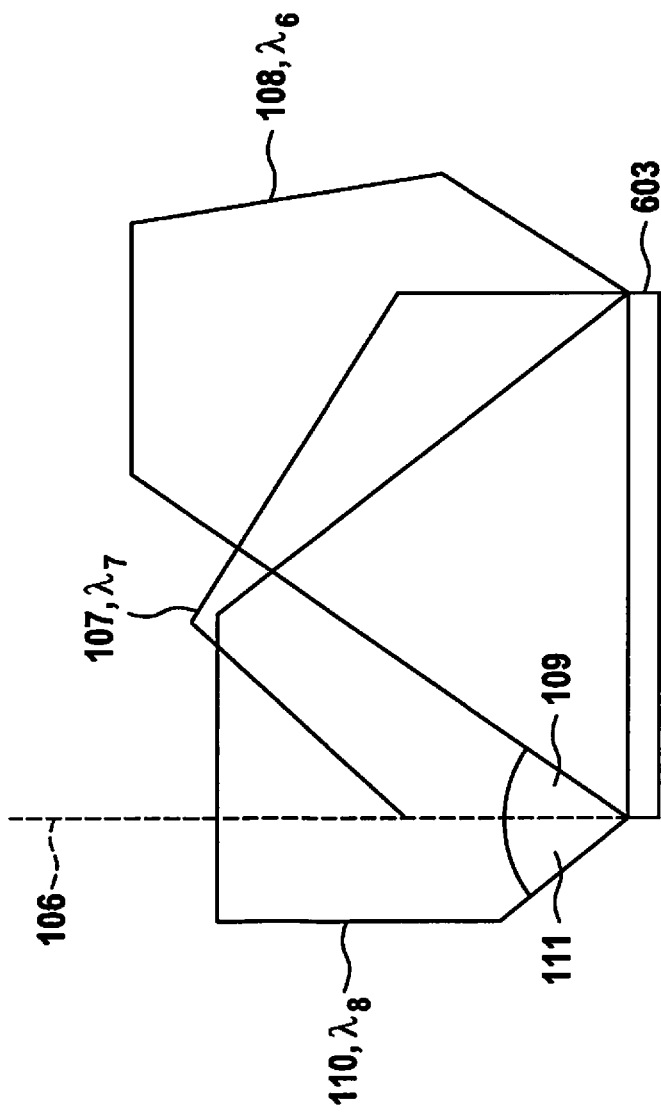
FIG. 8 shows a schematic representation of the wavelength-dependent angles of radiation of an optical phased array.

FIG. 8 shows the schematic representation of the wavelength-dependent angles of radiation of an optical phased array 603. By varying the wavelength of laser 303 it is possible to change the direction of beam of optical phased array 603. FIG. 7 shows how electromagnetic radiation of three different wavelengths $\lambda_6$, $\lambda_7$ and $\lambda_8$ is emitted by optical phased array 603 into scanning field 105. Wavelength $\lambda_6$ here has the highest value (that is, it is red-shifted with respect to the other two wavelengths shown), wavelength $\lambda_8$ has the lowest value (that is, it is blue-shifted with respect to the other two wavelengths shown) and wavelength $\lambda_7$ lies in between. Due to the properties of optical phased array 603 it is possible to emit radiation of the greatest wavelength $\lambda_6$ as beam 108 with a deflection by a negative angle 109 from orientation 106 of scanning field 105. The intermediate wavelength $\lambda_7$ may be chosen in such a way that it is emitted as beam 107 along the orientation 106 of scanning field 105. The smallest wavelength $\lambda_8$ may be chosen in such a way that it is emitted as beam 110 with a deflection by a positive angle 111 from orientation 106 of scanning field 105.

Following the backscattering and/or reflection of the electromagnetic radiation on an object 112 in scanning field 105, receiver unit 702 shown in FIG. 7 is able to detect the received beams 117, 118 and 120. To ensure that radiation of the greatest wavelength $\lambda_6$ strikes the surface of filter 113 at an angle 703 of 90°, band-pass filter 113 is tilted by an angle 704 with respect to optical axis 116 of the receiver unit.

Figure 9:
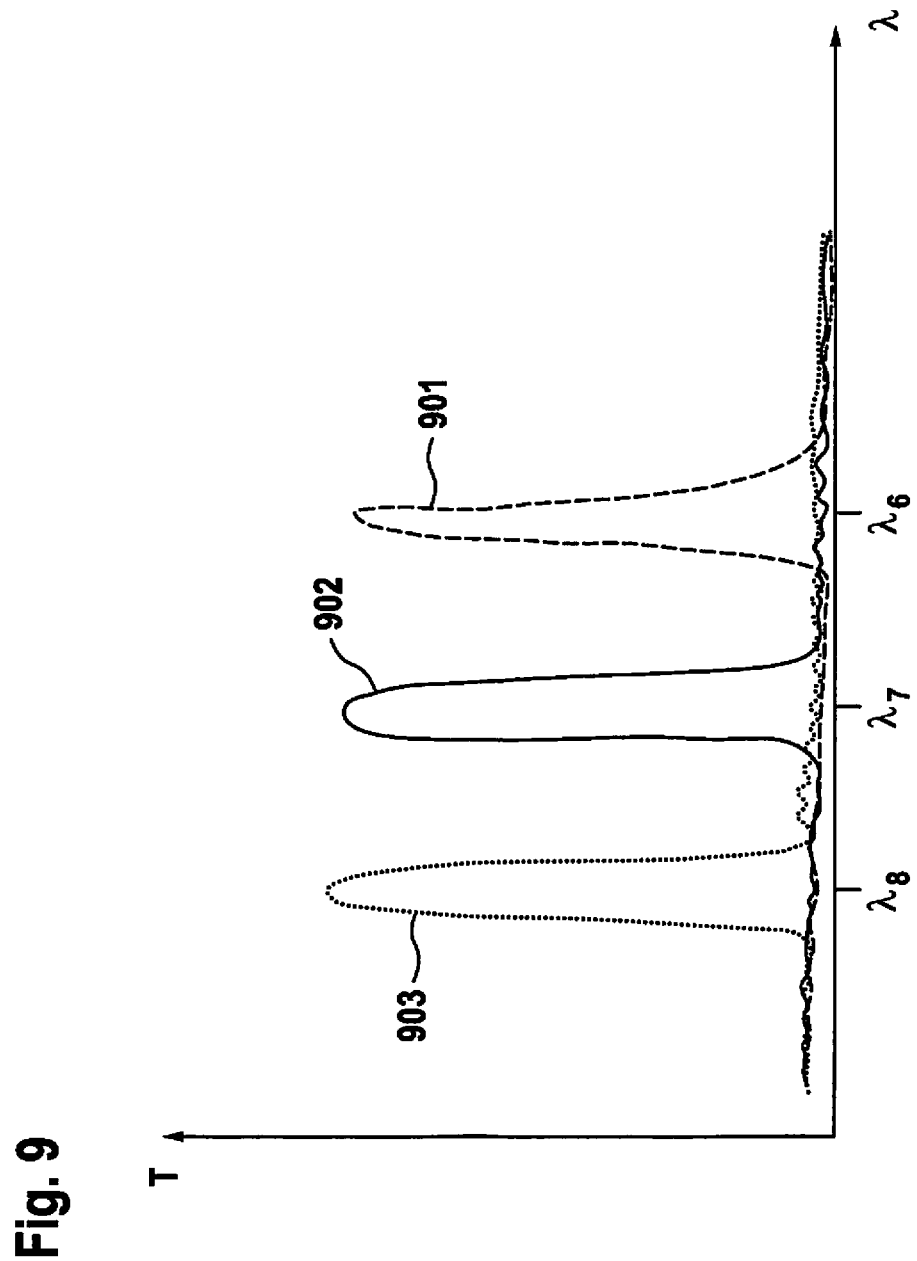
FIG. 9 shows a transmittance characteristic of a band-pass filter according to one variant of an embodiment of the present invention including an optical phased array.

FIG. 9 shows the transmittance characteristic of a band-pass filter 113 according to the variant of an embodiment of the present invention having the optical phased array 303, as is shown in FIG. 7 by way of example. In the diagram shown, the transmittance T of optical filter element 113 is again plotted against wavelength $\lambda$ of the emitted and backscattered and/or reflected radiation. Curve 901 shows the filter characteristic of band-pass filter 113 for beam 118 striking the filter surface perpendicularly. The tilting of band-pass filter 113 by angle 704 described above ensures that the electromagnetic radiation of the greatest wavelength $\lambda_6$ strikes band-pass filter 113 perpendicularly. Band-pass filter 113 shows again the characteristic shift of its transmittance characteristic toward lower wavelengths with a rising angle of incidence of the electromagnetic radiation with respect to the perpendicular line of the filter surface. Thus curve 902 indicates the filter characteristic of band-pass filter 113 for radiation 117, which strikes band-pass filter 113 at an angle 705 with respect to the perpendicular line of band-pass filter 113. The transmittance maximum is in this case at wavelength $\lambda_7$. Curve 903 indicates the filter characteristic of band-pass filter 113 for radiation 120, which strikes band-pass filter 113 at an angle 706 with respect to the perpendicular line of band-pass filter 113. The transmittance maximum is in this case at wavelength $\lambda 8$. The combination shown in FIG. 6 of wavelength-variable laser 303 and optical phase array 603 makes it possible for the emitted and received electromagnetic radiation to be always in the transmittance range of band-pass filter 113. The half width of filter 113 may be selected to be narrow.

What is claimed is:

1. An optical system for detecting a scanning field, comprising:
  a transmitter, including at least one source for emitting electromagnetic radiation, and at least one deflection unit for deflecting the beam path of the electromagnetic radiation emitted by the source into the scanning field; and
  at least one optical receiver, including at least one optical filter element for filtering the electromagnetic radiation backscattered and/or reflected in the scanning field, and at least one detector element for detecting the filtered electromagnetic radiation;

wherein the wavelength of the electromagnetic radiation emitted by the source is variable, and wherein the variation of the wavelength occurs as a function of the deflection of the beam path;

wherein the deflection unit is a deflection mirror that is swivel-abled in an oscillating manner about an orientation of the scanning field and/or in a second dimension;

wherein the wavelength of the electromagnetic radiation emitted by the source is varied synchronously with the deflection mirror that is swivel-able in an oscillating manner;

wherein the variation of the wavelength occurs in such a manner that: (i) as the deflection mirror moves from a 0° angle of deflection of the deflection mirror to a maximum deflection angle of the deflection mirror, the wavelength emitted by the source increases synchronously with the movement of the deflection mirror, and (ii) as the deflection mirror moves from the maximum deflection angle of the deflection mirror to 0° angle of deflection of the deflection mirror, the wavelength emitted by the source decreases synchronously with the movement of the deflection mirror.

2. The optical system of claim 1, wherein the source for emitting electromagnetic radiation includes a laser.

3. The optical system of claim 1, wherein at least one optical filter element includes a band-pass filter.

4. The optical system of claim 1, wherein the variation of the wavelength occurs as a function of the transmittance of the at least one optical filter element.

5. The optical system of claim 1, wherein the receiver includes a lens for focusing the received electromagnetic radiation, which is filtered by the optical filter element, onto the detector element.

6. The optical system of claim 1, wherein the source for emitting electromagnetic radiation is a diode laser.

7. The optical system of claim 1, wherein the deflection mirror includes a micromirror.

8. A method for controlling an optical system, having a transmitter and an at least one optical receiver, for detecting a scanning field, the method comprising:

transmitting, via the transmitter of the optical system, electromagnetic radiation, wherein the optical system includes the transmitter, including at least one source for emitting electromagnetic radiation, and at least one deflection unit for deflecting the beam path of the electromagnetic radiation emitted by the source into the scanning field; and receiving, via the at least one optical receiver of the optical system, wherein the at least one optical receiver includes at least one optical filter element for filtering the electromagnetic radiation backscattered and/or reflected in the scanning field, and at least one detector element for detecting the filtered electromagnetic radiation;

wherein the wavelength of the electromagnetic radiation emitted by the source is variable, and wherein the variation of the wavelength occurs as a function of the deflection of the beam path;

wherein the deflection unit is a deflection mirror that is swivel-abled in an oscillating manner about the orientation of the scanning field and/or in a second dimension;

wherein the wavelength of the electromagnetic radiation emitted by the source is varied synchronously with the deflection mirror that is swivel-able in an oscillating manner;

wherein the variation of the wavelength occurs in such a manner that: (i) as the deflection mirror moves from a 0° angle of deflection of the deflection mirror to a maximum deflection angle of the deflection mirror, the wavelength emitted by the source increases synchronously with the movement of the deflection mirror, and (ii) as the deflection mirror moves from the maximum deflection angle of the deflection mirror to 0° angle of deflection of the deflection mirror, the wavelength emitted by the source decreases synchronously with the movement of the deflection mirror.

9. The method of claim 8, wherein the deflection mirror includes a micromirror.

* * * * *